US012754511B2

(12) United States Patent
Jung et al.

(10) Patent No.: US 12,754,511 B2
(45) Date of Patent: Oct. 6, 2026

(54) HOLOGRAM DISPLAY DEVICE

(71) Applicant: Samsung Display Co., Ltd., Yongin-Si (KR)

(72) Inventors: Jiwon Jung, Yongin-si (KR); Guanghai Jin, Yongin-si (KR)

(73) Assignee: Samsung Display Co., Ltd., Yongin-Si (KR)

( * ) Notice: Subject to any disclaimer, the term of this patent is extended or adjusted under 35 U.S.C. 154(b) by 0 days.

(21) Appl. No.: 19/198,448

(22) Filed: May 5, 2025

(65) Prior Publication Data

US 2026/0044111 A1 Feb. 12, 2026

(30) Foreign Application Priority Data

Aug. 9, 2024 (KR) ........................ 10-2024-0106867

(51) Int. Cl.
*G03H 1/00* (2006.01)
*G03H 1/04* (2006.01)

(52) U.S. Cl.
CPC ......... *G03H 1/0005* (2013.01); *G03H 1/0486* (2013.01); *G03H 2001/0088* (2013.01); *G03H 2222/12* (2013.01); *G03H 2225/35* (2013.01)

(58) Field of Classification Search
CPC ............... G03H 1/0005; G03H 1/0486; G03H 2001/0088; G03H 2222/12; G03H 2225/35
See application file for complete search history.

(56) References Cited

U.S. PATENT DOCUMENTS

| | | | | |
|---|---|---|---|---|
| 8,400,695 B2 | 3/2013 | Kroll et al. | | |
| 11,687,032 B2 | 6/2023 | Kim | | |
| 2023/0225170 A1* | 7/2023 | Sun | ...................... | H10K 59/352 257/40 |
| 2025/0095122 A1* | 3/2025 | Pohl | .......................... | G06T 5/80 |

FOREIGN PATENT DOCUMENTS

KR 1020210022228 A 3/2021

OTHER PUBLICATIONS https://qph.cf2.quoracdn.net/main-qimg-8bcee6be6858a60adae8a1b6009b6a27-lq.

Dongyeon Kim et al., Holographic Parallax Improves 3D Perceptual Realism, ACM Trans. Graph., vol. 43, No. 4, Article 68. Publication date Jul. 2024, 13 pages.

Gun-Yeal Lee et al., Metasurface eyepiece for augmented reality, Nature Communications, 9, Article No. 4562 (2018), 10 pages.

Yifan Peng et al., Speckle-free holography with partially coherent light sources and camera-in-the-loop calibration, Sci. Adv. 7, eabg5040 (2021), 7 pages.

* cited by examiner

*Primary Examiner* — Kyle M Lotfi
(74) *Attorney, Agent, or Firm* — Innovation Counsel LLP

(57) ABSTRACT

Disclosed is a hologram display device, which includes a light source unit that provides source light, and a light modulation panel spaced apart from the light source unit and including unit pixels and forming a circular shape on a plane, and each of the unit pixels includes first sub-pixels, second sub-pixels, and third sub-pixels, and the number of first sub-pixels included in each of the unit pixels decreases with distance from a center of the light modulation panel moving toward an outer edge of the light modulation panel.

20 Claims, 9 Drawing Sheets

HOLOGRAM DISPLAY DEVICE

CROSS-REFERENCE TO RELATED APPLICATION(S)

This application claims priority, under 35 U.S. C. § 119, to Korean Patent Application No. 10-2024-0106867 filed on Aug. 9, 2024 in the Korean Intellectual Property Office, the disclosures of which are incorporated by reference herein in their entireties.

BACKGROUND

Embodiments of the present disclosure described herein relate to a hologram display device, and more particularly, relate to a hologram display device having reduced chromatic aberration.

Hologram display devices are being commercialized as a three-dimensional image display method. The hologram display devices are known as display device technology that uses the principle of reproducing an image of an original object when a reference light is irradiated and diffracted on the hologram pattern in which an interference pattern is recorded by interfering the object light reflected from the original object with the reference light. A light modulation device may generate a three-dimensional image by forming a hologram pattern and diffracting a reference light.

SUMMARY

Embodiments of the present disclosure provide a hologram display device capable of preventing distortion of a hologram image due to color aberration.

According to an embodiment of the present disclosure, a hologram display device includes a light source unit that provides source light, and a light modulation panel spaced apart from the light source unit, including unit pixels, and forming a circular shape on a plane.

Each of the unit pixels includes first sub-pixels, second sub-pixels, and third sub-pixels.

The number of first sub-pixels included in each of the unit pixels decreases with distance from a center of the light modulation panel moving toward an outer edge of the light modulation panel.

According to an embodiment, the number of second sub-pixels included in each of the unit pixels may increase with distance from the center of the light modulation panel moving toward the outer edge of the light modulation panel.

According to an embodiment, the number of third sub-pixels included in each of the unit pixels may be constant.

According to an embodiment, each of the first sub-pixels, the second sub-pixels, and the third sub-pixels have the same area on the plane.

According to an embodiment, among the unit pixels, the unit pixel closest to the center of the light modulation panel may be a center-adjacent pixel.

The number of first sub-pixels included in the center-adjacent pixel may be greater than the number of second sub-pixels included in the center-adjacent pixel.

According to an embodiment, the number of first sub-pixels included in the center-adjacent pixel may be between 1.2 times and 2.8 times the number of second sub-pixels included in the center-adjacent pixel.

According to an embodiment, among the unit pixels, the unit pixel that is farthest from the center of the light modulation panel may be an outer adjacent pixel.

The number of second sub-pixels included in the outer adjacent pixel may be greater than the number of first sub-pixels included in the outer adjacent pixel.

According to an embodiment, the number of second sub-pixels included in the outer adjacent pixel may be between 1.05 times and 1.55 times the number of first sub-pixels included in the outer adjacent pixel.

According to an embodiment, the first to third sub-pixels included in each of the unit pixels may be arranged in n rows and m columns, wherein n may be a natural number greater than or equal to 4 and less than or equal to 8, and m may be a natural number greater than or equal to 2 and less than or equal to 4.

According to an embodiment, the first sub-pixel may provide blue light.

The second sub-pixel may provide red light.

The third sub-pixel may provide green light.

According to an embodiment, the hologram display device may further include a first optical unit disposed between the light source unit and the light modulation panel and including a first lens, and a second optical unit across the light modulation panel from the light source unit, the second optical unit including a second lens.

According to an embodiment, there may be an imaginary concentric circle centered around the center of the light modulation panel The unit pixels may be arranged along a circumference of the concentric circle and overlap with the circumference of the concentric circle.

According to an embodiment, a total area of the first sub-pixels included in each of the unit pixels may decrease with distance from the center of the light modulation panel moving toward the outer edge of the light modulation panel. A total area of the second sub-pixels included in each of the unit pixels may increase with distance from the center of the light modulation panel moving toward the outer edge of the light modulation panel.

According to an embodiment, the light modulation panel may include a center area where a subset of the unit pixels are disposed and overlaps the center, and an outer area surrounding the center area, in which a second subset of the unit pixels that is not included in the first subset of the unit pixels are disposed.

The number of first sub-pixels included in the unit pixels in the first subset may be greater than the number of second sub-pixels included in the unit pixels in the first subset.

The outer area may include a first area where the number of first sub-pixels included in the unit pixels disposed is greater than the number of second sub-pixels, and a second area where the number of second sub-pixels included in the unit pixels disposed is greater than the number of first sub-pixels.

According to an embodiment, the outer area may further include an intermediate area disposed between the first area and the second area.

The number of first sub-pixels included in the unit pixels disposed in the intermediate area may be the same as the number of third sub-pixels included in the unit pixels disposed in the intermediate area.

According to an embodiment, the unit pixels may be arranged in a first direction and a second direction intersecting the first direction.

Some of the unit pixels may overlap one of boundaries between the center area, the first area, the second area, and a third area.

According to an embodiment of the present disclosure, a hologram display device includes a light source unit that provides source light, and a light modulation panel spaced apart from the light source unit, including pixels, and forming a rectangular shape on a plane.

Each of the pixels includes first sub-pixels, second sub-pixels, and third sub-pixels.

The number of first sub-pixels included in each of the pixels decreases with distance from a center of an outer circle of the light modulation panel to an outer edge of the light modulation panel.

According to an embodiment, the number of second sub-pixels included in each of the pixels may increase with distance from the center of the outer circle moving toward the outer edge of the light modulation panel.

According to an embodiment each of the first sub-pixels, the second sub-pixels, and the third sub-pixels have a same shape and a same area on the plane.

According to an embodiment, the light modulation panel may further include a center area centered around the center, an outer area surrounding the center area, and corner areas adjacent to the outer area and extending to vertices of the rectangular shape.

BRIEF DESCRIPTION OF THE FIGURES

The above and other objects and features of the present disclosure will become apparent by describing in detail embodiments thereof with reference to the accompanying drawings.

DETAILED DESCRIPTION

Figure 1:
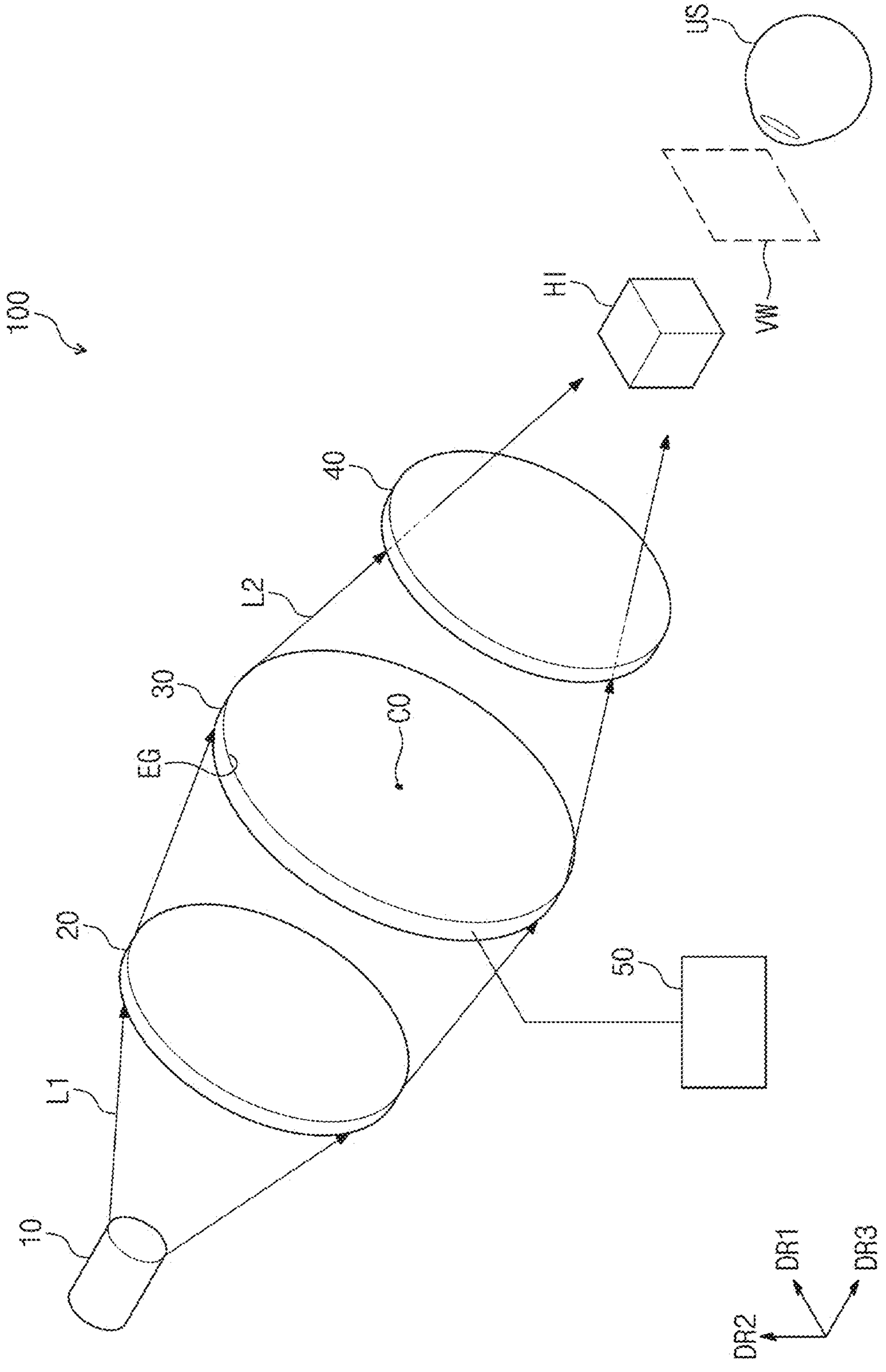
FIG. 1 is a perspective view schematically illustrating a configuration of a hologram display device of the present disclosure.

While the present disclosure may be modified and altered, specific embodiments are shown by way of examples in the drawings and will herein be described in detail. It should be understood, however, that the examples presented herein do not limit the present disclosure to the particular forms disclosed. On the contrary, the present disclosure covers all modifications, equivalents, and alternatives falling within the spirit and scope of the present disclosure.

In the specification, when one component (or area, layer, part, or the like) is referred to as being "on", "connected to", or "coupled to" another component, it should be understood that the former may be directly on, connected to, or coupled to the latter, and also may be on, connected to, or coupled to the latter via a third intervening component.

Like reference numerals refer to like components. In drawings, the thickness, ratio, and dimension of components are exaggerated for effectiveness of description of technical contents. The term "and/or" includes one or more combinations of the associated listed items.

The terms "first", "second", etc. are used to describe various components, but the components are not limited by the terms. The terms are used only to differentiate one component from another component. For example, a first component may be named as a second component, and vice versa, without departing from the spirit or scope of the present disclosure. A singular form, unless otherwise stated, includes a plural form.

Also, terms such as "under", "beneath", "on", "above" are used to describe a relationship between components illustrated in a drawing. The terms are relative and are used in reference to a direction indicated in the drawing.

It will be understood that the terms "include", "comprise", "have", etc. specify the presence of features, numbers, steps, operations, elements, or components, described in the specification, or a combination thereof, not precluding the presence or additional possibility of one or more other features, numbers, steps, operations, elements, components, or a combination thereof.

Unless defined otherwise, all terms (including technical and scientific terms) used herein have the same meaning as commonly understood by one of ordinary skill in the art to which this disclosure belongs. In addition, terms such as terms defined in commonly used dictionaries should be interpreted as having a meaning consistent with the meaning in the context of the related technology, and should not be interpreted in an ideal or formal manner unless explicitly so defined in the present disclosure.

Hereinafter, embodiments of the present disclosure will be described with reference to accompanying drawings.

FIG. 1 is a perspective view schematically illustrating a configuration of a hologram display device of the present disclosure.

Referring to FIG. 1 below, the configuration and arrangement relationship included in a hologram display device 100 will be described.

The hologram display device 100 may be an electronic device that provides a three-dimensional hologram image HI. For example, the hologram display device 100 may be provided in the form of various electronic devices such as a monitor, a TV, a mobile display device, etc.

Referring to FIG. 1, the hologram display device 100 may include a light source unit 10, a first optical unit 20, a light modulation panel 30, and a second optical unit 40.

The light source unit 10 may include at least one light source to provide source light L1. The light source included in the light source unit 10 may be a laser having spatial coherence. However, when the source light L1 has sufficient spatial coherence to form the hologram image HI, the light source included in the light source unit 10 is not limited to a laser. For example, the light source included in the light source unit 10 may be provided with a light emitting diode (LED) that emits the source light L1 that may be diffracted and modulated. The light source unit 10 may include a light source array in which a plurality of light sources are arranged in a certain regular manner.

The first optical unit 20 may be disposed between the light source unit 10 and the light modulation panel 30 described below. The first optical unit 20 may refract the source light L1 and may provide the refracted source light L1 to one surface of the light modulation panel 30. The first optical unit 20 may include at least one lens that refracts the source light L1. Although the first optical unit 20 is illustrated in the form of a circular lens in FIG. 1, the shape of the first optical unit 20 is not limited to the particular embodiment depicted in FIG. 1 as long as it may refract the source light L1.

The source light L1 may be provided to the light modulation panel 30 in the form of coherence plane light. For example, the source light L1 may be refracted by the first optical unit 20 and may be provided in the form of plane light. However, when the light source unit 10 provides plane light, the first optical unit 20 may be omitted.

The light modulation panel 30 may be a panel that spatially modulates light. The light modulation panel 30 may control at least one of the intensity (amplitude), color, and phase of the incident source light L1. The light modulated by the light modulation panel 30 may be provided in the form of output light L2. The light modulation panel 30 may be a transmissive type or a reflective type.

The light modulation panel 30 may include pixels PX (refer to FIG. 4) for providing the output light L2. The pixels PX may include, but are not limited to, LCos (Liquid Crystal on Silicon) elements, LCD (Liquid Crystal Display) elements, or organic light emitting diodes (OLED). The pixels PX may be arranged in a two-dimensional form on the light modulation panel 30, and the arrangement method of the pixels PX will be described later with reference to FIG. 3, etc.

The second optical unit 40 may be spaced apart from the light source unit 10 with the light modulation panel 30 and the first optical unit 20 interposed therebetween. The second optical unit 40 may be a member that converges the output light L2 modulated through the light modulation panel 30. In detail, the second optical unit 40 includes a lens, and may converge the output light L2 through the lens to form the hologram image HI at a position suitable for viewing by a user US. Although the second optical unit 40 is illustrated in the form of a circular lens in FIG. 1, the second optical unit 40 is not limited to any particular shape as long as it may refract the output light L2.

A viewing window VW that may observe the hologram image HI at the position of the user US may be formed by the second optical unit 40. In FIG. 1, the viewing window VW is illustrated with broken lines in the shape of a square. However, the viewing window VW is not limited to the shape or size illustrated.

Figure 2A:
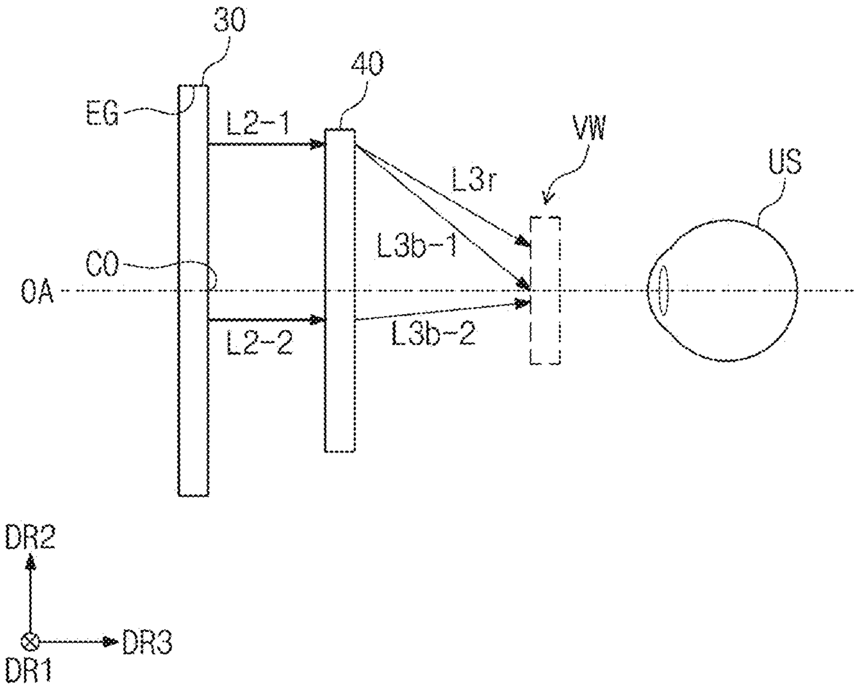
FIG. 2A is a diagram illustrating a process in which output light is dispersed and chromatic aberration occurs.
Figure 2B:
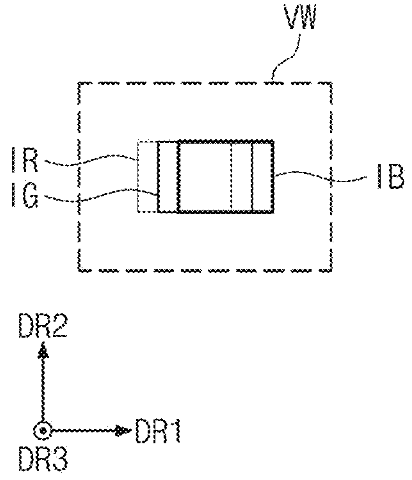
FIG. 2B is a plan view illustrating a viewing window in which chromatic aberration occurs.

FIG. 2A is a diagram illustrating a process in which output light is dispersed and chromatic aberration occurs. FIG. 2B is a plan view illustrating a viewing window in which chromatic aberration occurs.

Referring to FIGS. 2A and 2B, the chromatic aberration problem that the present disclosure seeks to solve will be described.

The output light L2 (refer to FIG. 1) may be refracted in the process of passing through the second optical unit 40 or the pupil of the user US. FIG. 2A illustrates 2-1 output light L2-1 and 2-2 output light L2-2 as examples of the output light L2 (refer to FIG. 1).

The 2-1 output light L2-1 may be dispersed in the process of passing through the second optical unit 40 due to the difference in refractive index depending on wavelength. FIG. 2A illustrates an example where the 2-1 output light L2-1 is dispersed to form first refracted light L3*r* and second refracted light L3*b*-1.

When comparing the first refracted light L3*r* with the second refracted light L3*b*-1, the first refracted light L3*r* may have a wavelength longer than the second refracted light L3*b*-1 and may have a focal length longer than the second refracted light L3*b*-1. The second refracted light L3*b*-1 may have a wavelength shorter than the first refracted light L3*r* and may have a focal length shorter than the first refracted light L3*r*.

A third refracted light L3*b*-2 is an example of light having the same wavelength as the second refracted light L3*b*-1 among the light formed by dispersing the 2-2 output light L2-2.

When comparing the third refracted light L3*b*-2 with the second refracted light L3*b*-1, it may be seen that the second refracted light L3*b*-1 output from a location closer to an outer edge EG of the light modulation panel 30 has a focal length shorter than the third refracted light L3*b*-2 output from a location closer to a center C0 of the light modulation panel 30.

In detail, when light with a short wavelength is emitted from a location closer to the outer edge EG of the light modulation panel 30, the focal length may be shortened, and when light with a long wavelength is emitted from a location closer to the center C0 of the light modulation panel 30, the focal length may be lengthened.

Therefore, the hologram image HI (refer to FIG. 1) with a large "focal length difference" may be formed by light with a short wavelength emitted from a location closer to the outer edge EG of the light modulation panel 30 and light with a long wavelength emitted from a location closer to the center C0 of the light modulation panel 30. As the difference in the focal length of the dispersed light increases, "chromatic aberration" phenomenon may occur more strongly.

FIG. 2B illustrates the viewing window VW where an example of the chromatic aberration occurs. Due to the dispersion phenomenon of the output light L2 (refer to FIG. 1), a first hologram image IB, a second hologram image IR, and a third hologram image IG may occur in the viewing window VW. The first hologram image IB may be a blue hologram image, the second hologram image IR may be a red hologram image, and the third hologram image IG may be a green hologram image.

When such chromatic aberration phenomenon occurs, the hologram image HI (refer to FIG. 1) as seen by the user US may be distorted, such as having a blurred border.

Hereinafter, the configuration of a hologram display device in which the arrangement and density of each sub-pixel is designed to prevent distortion of the hologram image HI (refer to FIG. 1) that is caused by the chromatic aberration will be described.

Figure 3:
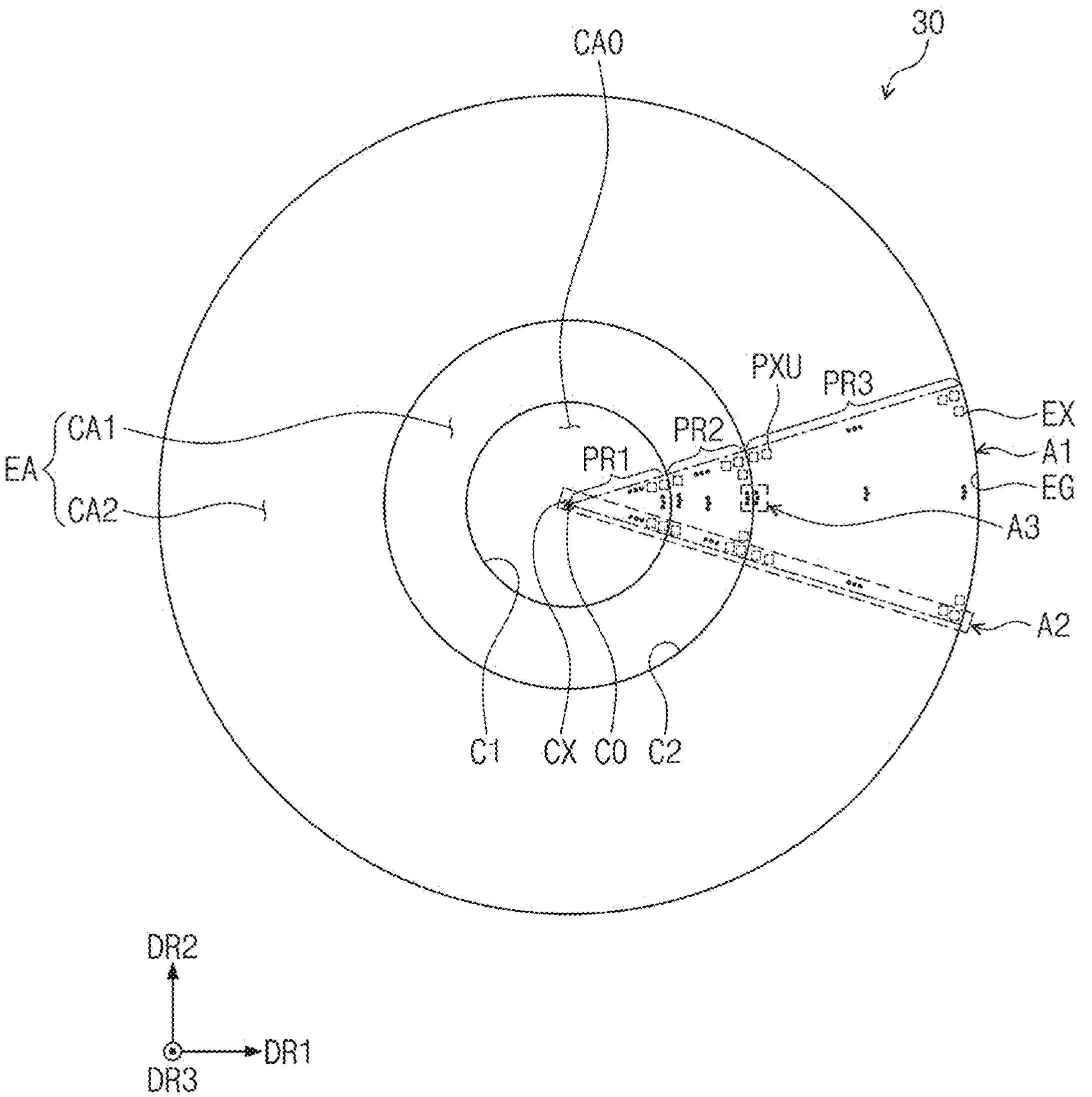
FIG. 3 is a plan view of a light modulation panel, according to an embodiment of the present disclosure.

FIG. 3 is a plan view of a light modulation panel, according to an embodiment of the present disclosure.

Hereinafter, the arrangement method of unit pixels PXU included in the light modulation panel 30 will be described with reference to FIG. 3. For convenience of description, FIG. 3 illustrates some of the unit pixels PXU arranged in an A1 area, which is a fan-shaped area from the center C0. Although there are more unit pixels PXU included in the light modulation panel 30, the remaining unit pixels PXU are omitted from the figures for clarity. The arrangement of the unit pixels PXU to be described with reference to FIG. 3 may be applied to areas other than the A1 area on the light modulation panel 30.

In this embodiment, the light modulation panel 30 may have a circular shape. Accordingly, the center C0 and the outer edge EG may be defined on the light modulation panel 30. In this specification, the center C0 of the light modulation panel may be defined as a center of the circle, which is a planar shape of the light modulation panel 30. The outer edge EG of the light modulation panel may be the periphery of the circle.

The light modulation panel 30 may include a plurality of unit pixels PXU. The unit pixel PXU may be an area where first sub-pixel SPX1, second sub-pixel SPX2, and third sub-pixel SPX3 (refer to FIG. 4) that provide the output light L2 (refer to FIG. 1) are arranged.

In FIG. 3, the unit pixel PXU is expressed as a square area outlined by a dotted line. However, the shape of the unit pixel PXU is selected based on the shape and number of first, second, and third sub-pixels SPX1, SPX2, and SPX3 (refer to FIG. 4) included in the unit pixel PXU, are not limited to that illustrated.

The unit pixel PXU is provided in plural, and the unit pixels PXU may be arranged on the light modulation panel 30.

In this specification, the unit pixel PXU closest to the center C0 of the light modulation panel 30 may be defined as a center-adjacent pixel CX, and the unit pixel PXU farthest from the center C0 of the light modulation panel 30 may be defined as an outer adjacent pixel EX.

In this embodiment, the center-adjacent pixel CX may be provided as one unit pixel PXU at the center C0 of the light modulation panel 30. However, the embodiment of the present disclosure is not limited thereto, and the center-adjacent pixel CX may be disposed to be spaced apart from the center C0 of the light modulation panel 30. When the center-adjacent pixel CX is spaced apart from the center C0 of the light modulation panel 30, the center-adjacent pixel CX may be provided in plurality.

The outer adjacent pixel EX may be provided as the unit pixel PXU closest to the outer edge EG of the light modulation panel 30. The outer adjacent pixel EX may be provided in plurality along the outer edge EG of the light modulation panel 30.

A plurality of unit pixels PXU may be arranged between the center-adjacent pixel CX and the outer adjacent pixel EX.

In this embodiment, the light modulation panel 30 may include a center area CA0 and an outer area EA.

The center area CA0 may be a circular area centered around the center C0 of the light modulation panel 30 and having a radius less than the radius of the light modulation panel 30.

The outer area EA may be an area surrounding the center area CA0. The outer area EA may include a first outer area CA1 surrounding the center area CA0 and having a ring shape, and a second outer area CA2 surrounding the first outer area CA1 and having a ring shape. In this case, since the second outer area CA2 extends to the outer edge EG of the light modulation panel 30, the second outer area CA2 may also be expressed as an "outermost area."

The boundary between the center area CA0 and the first outer area CA1 may be defined as a first boundary C1, and the boundary between the first outer area CA1 and the second outer area CA2 may be defined as a second boundary C2. The boundaries may be imaginary/conceptual, and do not need to be marked.

In this embodiment, a first pixel group PR1 may be disposed in the center area CA0, a second pixel group PR2 may be disposed in the first outer area CA1, and a third pixel group PR3 may be disposed in the second outer area CA2.

Each of the first to third pixel groups PR1 to PR3 may include one type of unit pixels PXU. However, the embodiment of the present disclosure is not limited thereto, and each of the first to third pixel groups PR1 to PR3 may include two or more types of unit pixels PXU.

Figure 4:
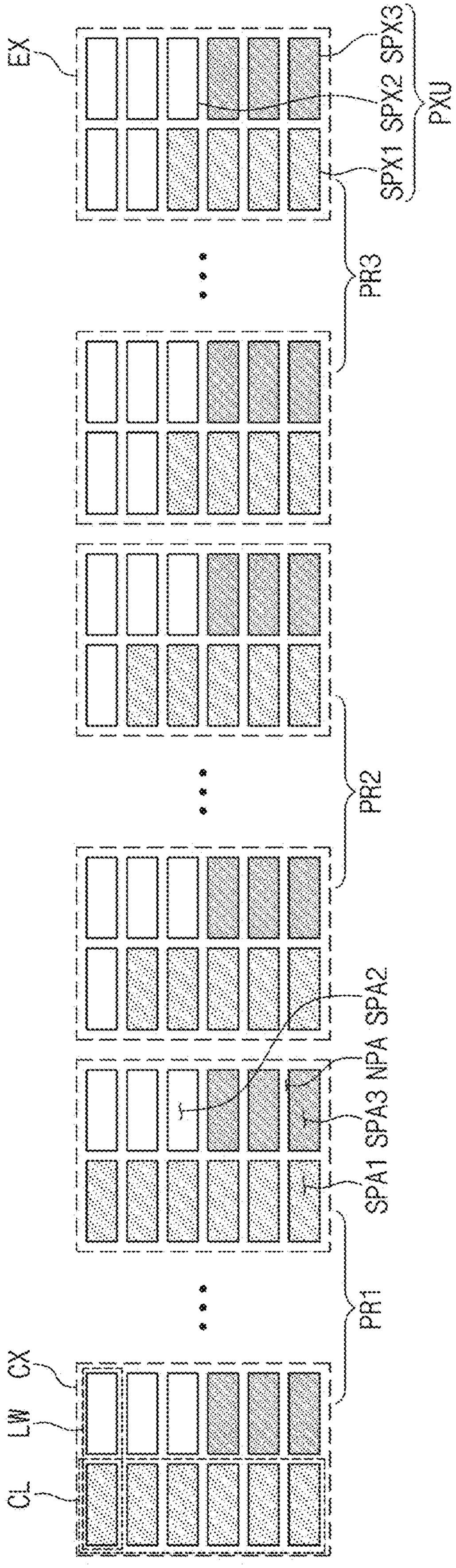
FIG. 4 is a diagram describing an arrangement order of unit pixels arranged in an A2 area of FIG. 3.
Figure 5:
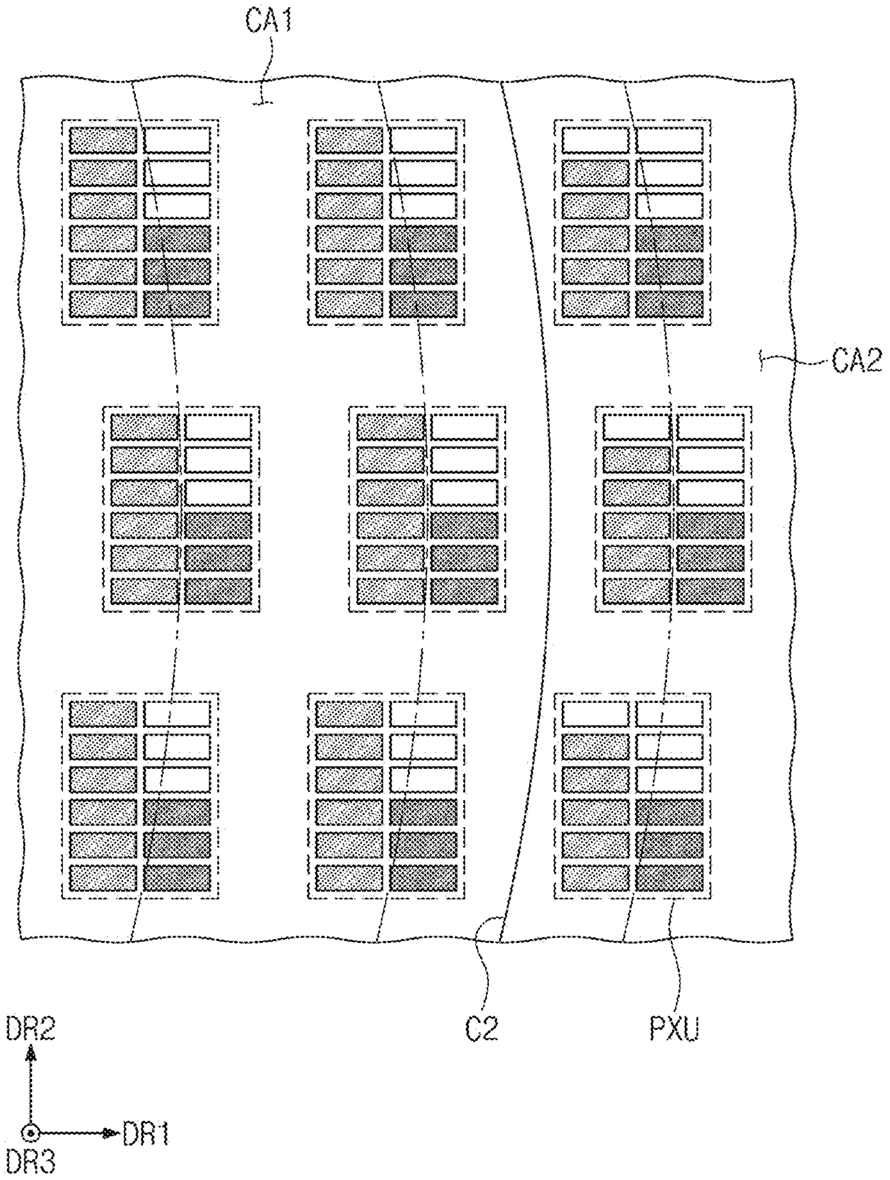
FIG. 5 is an enlarged plan view of an A3 area of FIG. 3.

FIG. 4 is a diagram describing an arrangement order of unit pixels arranged in an area A2 shown in FIG. 3. FIG. 5 is an enlarged plan view of area A3 of FIG. 3.

For convenience of description, in FIG. 4, the unit pixels PXU are arranged in a row, and some unit pixels PXU within the pixel group PR1, PR2, or PR3 are omitted.

The unit pixel PXU may include first, second, and third sub-pixels SPX1, SPX2, and SPX3. The first sub-pixel SPX1 may provide a first color light, the second sub-pixel SPX2 may provide a second color light, and the third sub-pixel SPX3 may provide a third color light. For example, the first color light may be blue light, the second color light may be red light, and the third color light may be green light.

The area where the first color light generated from the first sub-pixel SPX1 is provided, the area where the second color light generated from the second sub-pixel SPX2 is provided, and the area where the third color light generated from the third sub-pixel SPX3 is provided may be defined as a first pixel area SPA1, a second pixel area SPA2, and a third pixel area SPA3, respectively.

A peripheral area NPA may be disposed between the first pixel area SPA1, the second pixel area SPA2, and the third pixel area SPA3. The peripheral area NPA sets a boundary between the first to third pixel areas SPA1, SPA2, and SPA3 and may prevent color mixing between the first to third pixel areas SPA1, SPA2, and SPA3.

The first to third sub-pixels SPX1, SPX2, and SPX3 included in the unit pixel PXU may be provided with the same shape and area. Accordingly, the planar shape and size of the first to third pixel areas SPA1, SPA2, and SPA3 may be the same. In the embodiment of FIG. 4, each of the first to third sub-pixels SPX1, SPX2, and SPX3 included in the unit pixel PXU has a rectangular shape with the same area. However, the planar shape of the first to third sub-pixels SPX1, SPX2, and SPX3 is not limited to what is illustrated. For example, the first to third sub-pixels SPX1, SPX2, and SPX3 may have a circular shape, a diamond shape, etc.

The present disclosure may prevent the occurrence of a stain phenomenon of a display device referred to as "mura" by designing the shape and size/area of the first to third sub-pixels SPX1, SPX2, and SPX3 to be the same. In detail, the present disclosure may prevent the Mura phenomenon caused by the non-uniformity of the display device by designing the first to third sub-pixels SPX1, SPX2, and SPX3 to be uniform.

The first to third sub-pixels SPX1, SPX2, and SPX3 included in the unit pixel PXU may be arranged in n rows LW and m columns CL. For example, n may be a natural number greater than or equal to 4 and less than or equal to 8, and m may be a natural number greater than or equal to 2 and less than or equal to 4.

Referring to FIGS. 3 and 4, the number of first sub-pixels SPX1 included in each of the unit pixels PXU may decrease with distance from the center C0 (refer to FIG. 3) moving toward the outer edge EG (refer to FIG. 3) of the light modulation panel 30. Accordingly, the sum of the areas of the first sub-pixels SPX1 included in each of the unit pixels PXU may decrease with distance from the center C0 moving toward the outer edge EG of the light modulation panel 30.

In this specification, the expression "decrease" may include "stepwise decrease" in increments and a "gradual decrease."

The number of second sub-pixels SPX2 included in each of the unit pixels PXU may increase along with distance from the center C0 (refer to FIG. 3) moving toward the outer edge EG (refer to FIG. 3) of the light modulation panel 30.

Accordingly, the sum of the areas of the second sub-pixels SPX2 included in each of the unit pixels PXU may increase with distance from the center C0 moving toward the outer edge EG of the light modulation panel 30.

In this specification, the expression "increase" may include "stepwise increase" in increments and a "gradual increase."

The number of third sub-pixels SPX3 included in each of the unit pixels PXU may be the same. Accordingly, the sum of the areas of the third sub-pixels SPX3 included in each of the unit pixels PXU may remain constant.

The number of first sub-pixels SPX1 included in the center-adjacent pixel CX may be greater than the number of second sub-pixels SPX2 included in the center-adjacent pixel CX. For example, the number of first sub-pixels SPX1 included in the center-adjacent pixel CX may be between 1.2 times and 2.8 times the number of second sub-pixels SPX2 included in the center-adjacent pixel CX. However, the embodiment of the present disclosure is not limited thereto.

The number of second sub-pixels SPX2 included in the outer adjacent pixel EX may be greater than the number of first sub-pixels SPX1 included in the outer adjacent pixel EX. For example, the number of second sub-pixels SPX2 included in the outer adjacent pixel EX may be between 1.05 times and 1.55 times the number of first sub-pixels SPX1 included in the outer adjacent pixel EX. However, the embodiment of the present disclosure is not limited thereto.

In addition, the number of first sub-pixels SPX1 included in the unit pixels PXU arranged in the center area CA0 (refer to FIG. 3) may be greater than the number of second sub-pixels SPX2 included in the unit pixels PXU arranged in the center area CA0.

FIG. 4 illustrates an example in which the first to third sub-pixels SPX1, SPX2, and SPX3 are arranged in six rows LW and two columns CL.

The number of unit pixels PXU included in each of the first, second, and third pixel groups PR1, PR2, PR3 may be determined by the sizes of the center area CA0 (refer to FIG. 3), the first outer area CA1 (refer to FIG. 3), and the second outer area CA2 (refer to FIG. 3). As depicted in FIG. 3, the first pixel group PR1 is in the center area CA0, the second pixel group PR2 is in the first outer area CA1, and the third pixel group PR3 is in the second outer area CA2.

FIG. 4 illustrates the sub-pixel makeup of the first pixel group PR1, the second pixel group PR2, and the third pixel group PR3 according to an embodiment. In the embodiment of FIG. 4, the unit pixels PXU included in the first pixel group PR1 may include six of first sub-pixels SPX1, three of second sub-pixels SPX2, and three of third sub-pixels SPX3. The unit pixels PXU included in the second pixel group PR2 may include five of first sub-pixels SPX1, four of second sub-pixels SPX2, and three of third sub-pixels SPX3. The unit pixels PXU included in the third pixel group PR3 may include four of first sub-pixels SPX1, five second sub-pixels SPX2, and three of third sub-pixels SPX3.

In this specification, an area where the number of first sub-pixels SPX1 is greater than the number of second sub-pixels SPX2 in the unit pixels PXU arranged in the outer areas CA1 and CA2 (refer to FIG. 3) may be referred to as a "first area." An area where the number of second sub-pixels SPX2 is greater than the number of first sub-pixels SPX1 in the unit pixels PXU arranged in the outer areas CA1 and CA2 may be referred to as a "second area." For example, in this embodiment, the first outer area CA1 (refer to FIG. 3) may correspond to the first area, and the second outer area CA2 (refer to FIG. 3) may correspond to the second area.

In this embodiment, the number and the sum of the areas of the first sub-pixels SPX1 included in the unit pixels PXU may decrease with distance from the center C0 (refer to FIG. 3) moving toward the outer edge EG (refer to FIG. 3), in a stepwise manner. In detail, the number and the sum of the areas of the first sub-pixels SPX1 included in one unit pixel PXU may be uniform within each of the first to third pixel groups PR1, PR2, and PR3, and may step-decrease at the boundary between the first and second pixel groups PR1 and PR2 and the boundary between the second and third pixel groups PR2 and PR3.

In this embodiment, the number and the sum of the areas of the second sub-pixels SPX2 included in the unit pixels PXU may increase with distance from the center C0 (refer to FIG. 3) moving toward the outer edge EG (refer to FIG. 3), in a stepwise manner. In detail, the number and the sum of the areas of the second sub-pixels SPX2 included in one unit pixel PXU may be uniform in each of the first to third pixel groups PR1, PR2, and PR3, and may increase at the boundary between the first and second pixel groups PR1 and PR2 and the boundary between the second and third pixel groups PR2 and PR3.

In the present embodiment, the number and the sum of the areas of the third sub-pixels SPX3 may be uniform.

Accordingly, the hologram display device 100 (refer to FIG. 1) of the present disclosure may have a high proportion of the first sub-pixel SPX1 in an area adjacent to the center C0 (refer to FIG. 3) of the light modulation panel 30, and may have a high proportion of the second sub-pixel SPX2 in an area adjacent to the outer edge EG (refer to FIG. 3). As used herein, a "proportion of first sub-pixel SPX1" refers to the ratio of the area that the first sub-pixel SPX1 occupies out of the total area occupied by all sub-pixels included in one unit pixel.

In detail, in this embodiment, the area adjacent to the outer edge EG (refer to FIG. 3) has a high proportion of the second sub-pixel SPX2 having a longest wavelength out of the first, second, and third sub-pixels SPX1, SPX2, SPX3. The area adjacent to the center C0 (refer to FIG. 3) has a high proportion of the first sub-pixel SPX1 having a shortest wavelength out of the first, second, and third sub-pixels SPX1, SPX2, SPX3. Therefore, a "focal length difference" of the dispersed light formed by the output light L2 (refer to FIG. 2A) may be decreased.

Accordingly, the hologram display device 100 (refer to FIG. 1) of the present disclosure may provide the hologram image HI (refer to FIG. 1) with increased clarity by reducing or preventing chromatic aberration.

Referring to FIG. 5, the unit pixels PXU may be arranged along the circumferences of imaginary, conceptual concentric circles centered around the center C0 (refer to FIG. 3) of the light modulation panel 30. In FIG. 5, a part of a concentric circle that assists in the arrangement of unit pixels PXU is indicated by broken lines. However, the arrangement of unit pixels PXU is not limited to what is illustrated in FIG. 5. For example, the unit pixels PXU may be arranged in a first direction DR1 and a second direction DR2.

Figure 6:
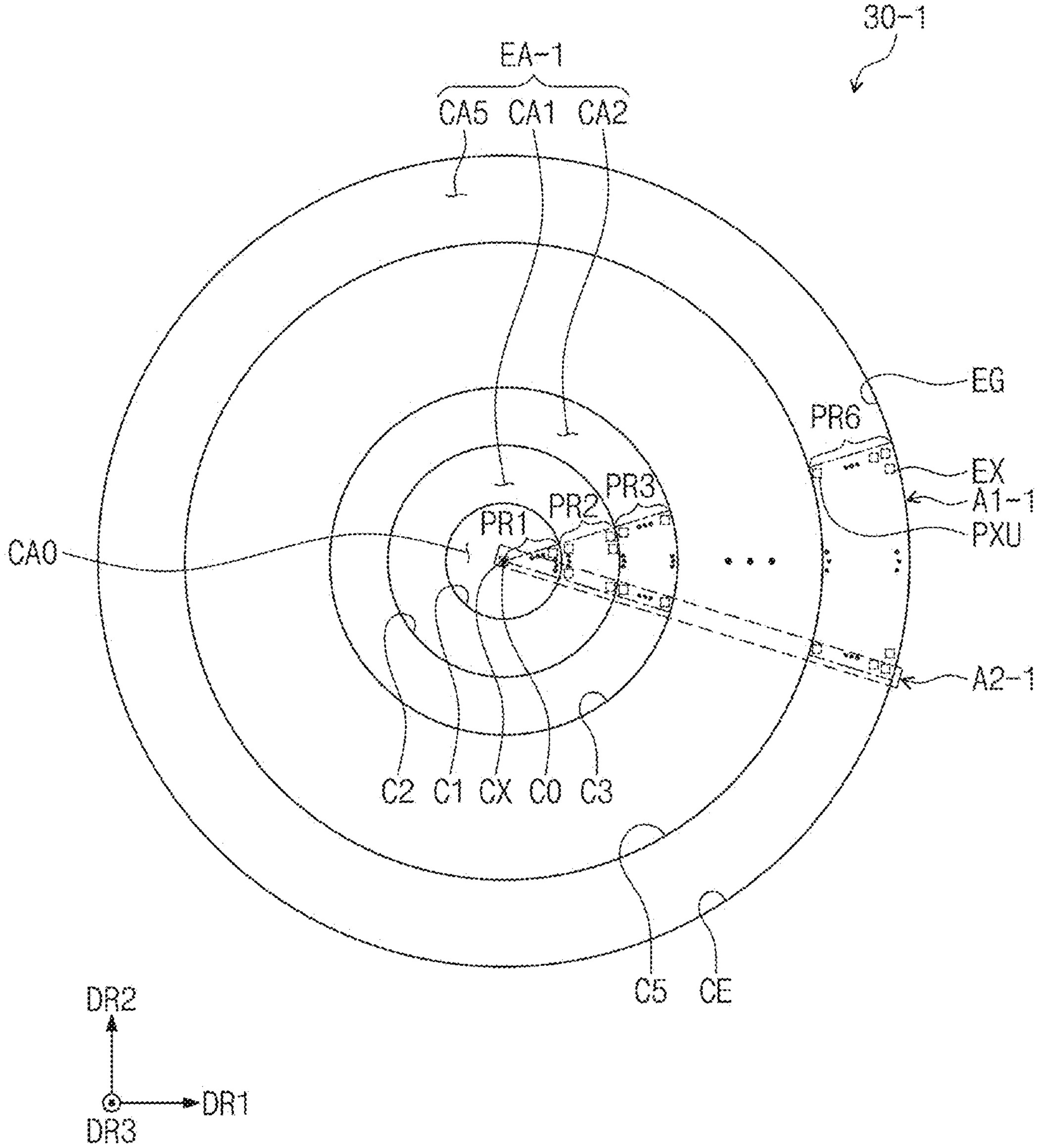
FIG. 6 is a plan view of a light modulation panel, according to an embodiment of the present disclosure.
Figure 7:
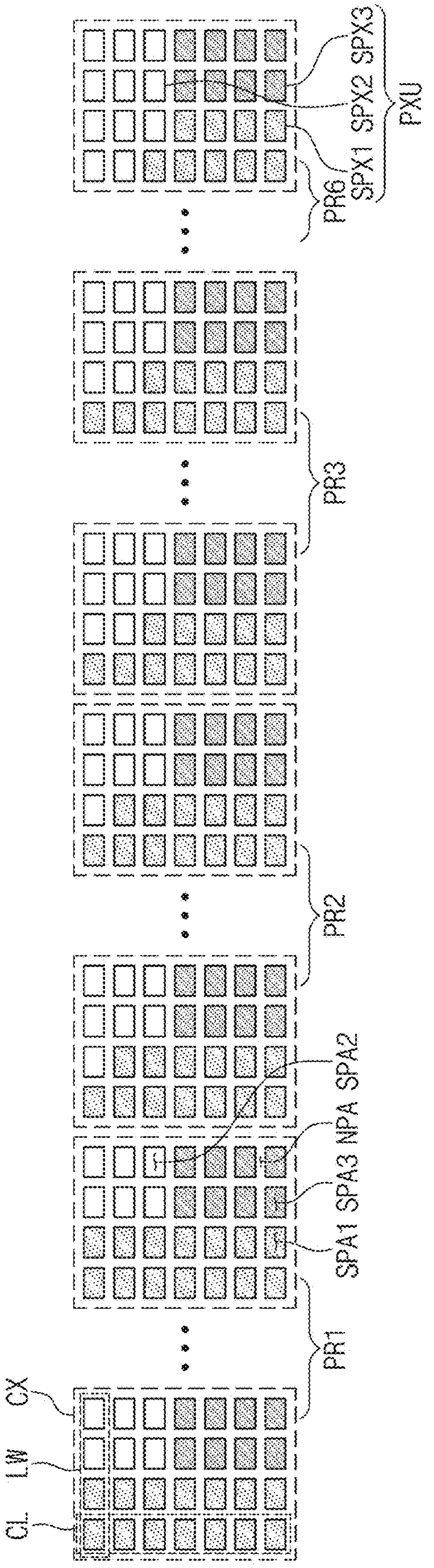
FIG. 7 is a diagram describing an arrangement order of unit pixels arranged in an A2-1 area of FIG. 6.

FIG. 6 is a plan view of a light modulation panel 30-1 according to an embodiment of the present disclosure. FIG. 7 is a diagram describing an arrangement order of unit pixels arranged in area A2-1 of FIG. 6.

The configurations identical/similar to those described with reference to FIGS. 1 to 5 are given identical/similar reference symbols, and duplicate descriptions will be omitted.

For convenience of description, FIG. 6 illustrates only some of the unit pixels PXU arranged in an A1-1 area, which is a fan-shaped area among the unit pixels PXU arranged on a light modulation panel 30-1, and the remaining unit pixels PXU are omitted. However, the arrangement method of the unit pixels PXU to be described with reference to FIG. 6 may be equally applied to areas other than the A1-1 area on the light modulation panel 30-1.

Referring to FIG. 6, the light modulation panel 30-1 in this embodiment may have a circular shape on the plane. Accordingly, the center C0 and the outer edge EG may be defined on the light modulation panel 30-1.

The light modulation panel 30-1 may include the center area CA0 of a circular shape centered around the center C0 of the light modulation panel 30-1 and having a radius less than the radius of the light modulation panel 30-1, and an outer area EA-1 of a ring shape surrounding the center area CA0.

In the present embodiment, the outer area EA-1 may include first to fifth outer areas. In FIG. 6, the first outer area CA1, the second outer area CA2, and a fifth outer area CA5 among the outer areas are illustrated as examples. Although the third outer area CA3 and the fourth outer area CA4 are arranged between the second outer area CA2 and the fifth outer area CA5, they are omitted from FIG. 6 to avoid overcrowding. Since the fifth outer area CA5 is in contact with the outer area EG of the light modulation panel 30-1, the fifth outer area CA5 may also be expressed as an "outermost area."

The light modulation panel 30-1 to be described with reference to FIGS. 6 and 7 may have outer areas that are more finely subdivided than the light modulation panel 30 described with reference to FIGS. 3 to 5.

The first pixel group PR1 may be arranged in the center area CA0, the second pixel group PR2 may be arranged in the first outer area CA1, the third pixel group PR3 may be arranged in the second outer area CA2, and a sixth pixel group PR6 may be arranged in the outermost area CA5. Fourth and fifth pixel groups may be arranged in third and fourth outer areas, which are omitted in FIG. 6, respectively.

The first to sixth pixel groups may each include the same unit pixels PXU. However, the embodiment of the present disclosure is not limited thereto, and two or more types of unit pixels PXU may be arranged in one pixel group.

FIG. 7 illustrates an example in which the first to third sub-pixels SPX1, SPX2, and SPX3 are arranged in seven rows LW and four columns CL.

The number of each unit pixel PXU included in each of the first to sixth pixel groups may be determined by the area of the center area CA0 (refer to FIG. 3), the first to fourth outer areas, and the outermost area CA5 (refer to FIG. 6).

In this embodiment, the unit pixels PXU included in the first pixel group PR1 may include fourteen first sub-pixels SPX1, six second sub-pixels SPX2, and eight third sub-pixels SPX3. The unit pixels PXU included in the second pixel group PR2 may include thirteen first sub-pixels SPX1, seven second sub-pixels SPX2, and eight third sub-pixels SPX3. The unit pixels PXU included in the third pixel group PR3 may include twelve first sub-pixels SPX1, eight second sub-pixels SPX2, and eight third sub-pixels SPX3. The unit pixels PXU included in the sixth pixel group PR6 may include nine first sub-pixels SPX1, eleven second sub-pixels SPX2, and eight third sub-pixels SPX3.

In the present embodiment, the second pixel group PR2 and the third pixel group PR3, in which the number of first sub-pixels SPX1 is greater than the number of second sub-pixels SPX2, are arranged in the first outer area CA1 (refer to FIG. 6) and the second outer area CA2 (refer to FIG. 6), respectively. Based on this, the first and second outer areas CA1 and CA2 (refer to FIG. 6) may be expressed as a "first area."

Although not illustrated separately, since the fourth pixel group in which the number of first sub-pixels SPX1 is the same as the number of second sub-pixels SPX2 is arranged in the third outer area, the third outer area may be expressed as a "middle area".

In the fourth outer area CA4 (not shown) and the fifth outer area CA5 (refer to FIG. 6), there may be the fifth pixel group and the sixth pixel group PR6, in which the number of second sub-pixels SPX2 is greater than the number of first sub-pixels SPX1. Based on this, the fourth outer area CA4 and the fifth outer area CA5 may be expressed as a "second area".

Referring to FIGS. 6 and 7 together, in the present embodiment, the number and the sum of the areas of the first sub-pixels SPX1 included in the unit pixels PXU may decrease with distance from the center C0 (refer to FIG. 6) moving toward the outer edge EG (refer to FIG. 6), in a stepwise manner. In detail, the number and the sum of the areas of the first sub-pixels SPX1 included in one unit pixel PXU are uniform inside each of the first to sixth pixel groups, but may decrease (step down) at each boundary, e.g. transitioning from first pixel group PR1 to second pixel group PR2, second pixel group PR2 to third pixel group PR3, etc.

In this embodiment, the number and the sum of the areas of the second sub-pixels SPX2 included in the unit pixels PXU increase with distance from the center C0 (refer to FIG. 6) moving toward the outer edge EG (refer to FIG. 6), in a stepwise manner. That is, the number and the sum of the areas of the second sub-pixels SPX2 included in one unit pixel PXU may be uniform inside each of the first to third pixel groups PR1, PR2, and PR3, but may increase (step up) at each boundary, transitioning from first pixel group PR1 to second pixel group PR2 and from second pixel group PR2 to third pixel group PR3.

In the present embodiment, the number and the sum of the areas of the third sub-pixels SPX3 may be uniform in all pixel groups PR1, PR2, PR3, PR4, PR5, PR6.

Accordingly, the light modulation panel 30-1 (refer to FIG. 6) of the present disclosure may have a high ratio of the first sub-pixel SPX1 in an area adjacent to the center C0 (refer to FIG. 6), and may have a high ratio of the second sub-pixel SPX2 in an area adjacent to the outer edge EG (refer to FIG. 6).

In detail, in this embodiment, the second sub-pixel SPX2 having a longest wavelength of the first, second, and third sub-pixels SPX1, SPX2, SPX3 may be arranged in a high proportion in the area that is adjacent to the outer edge EG (refer to FIG. 6). Conversely, the first sub-pixel SPX1 having a shortest wavelength of the first, second, and third sub-pixels SPX1, SPX2, SPX3 may be arranged at a high proportion in the area that is adjacent to the center C0 (refer to FIG. 6). Therefore, the "focal length difference" of the dispersed light formed by the output light L2 (refer to FIG. 2A) may be decreased. Accordingly, the hologram image HI (refer to FIG. 1) with increased clarity may be provided by reducing or preventing chromatic aberration.

In addition, since the light modulation panel 30-1 described with reference to FIGS. 6 and 7 has more subdivided outer areas than the light modulation panel 30 described with reference to FIGS. 3 to 5, the proportions of the first sub-pixels SPX1 and the second sub-pixels SPX2 may change more gradually, for example in smaller increments. In detail, the present disclosure may increase the number of first to third sub-pixels SPX1, SPX2, and SPX3 included in the unit pixel PXU and may subdivide the outer areas to change the first to third sub-pixels SPX1, SPX2, and SPX3 more gradually.

Figure 8:
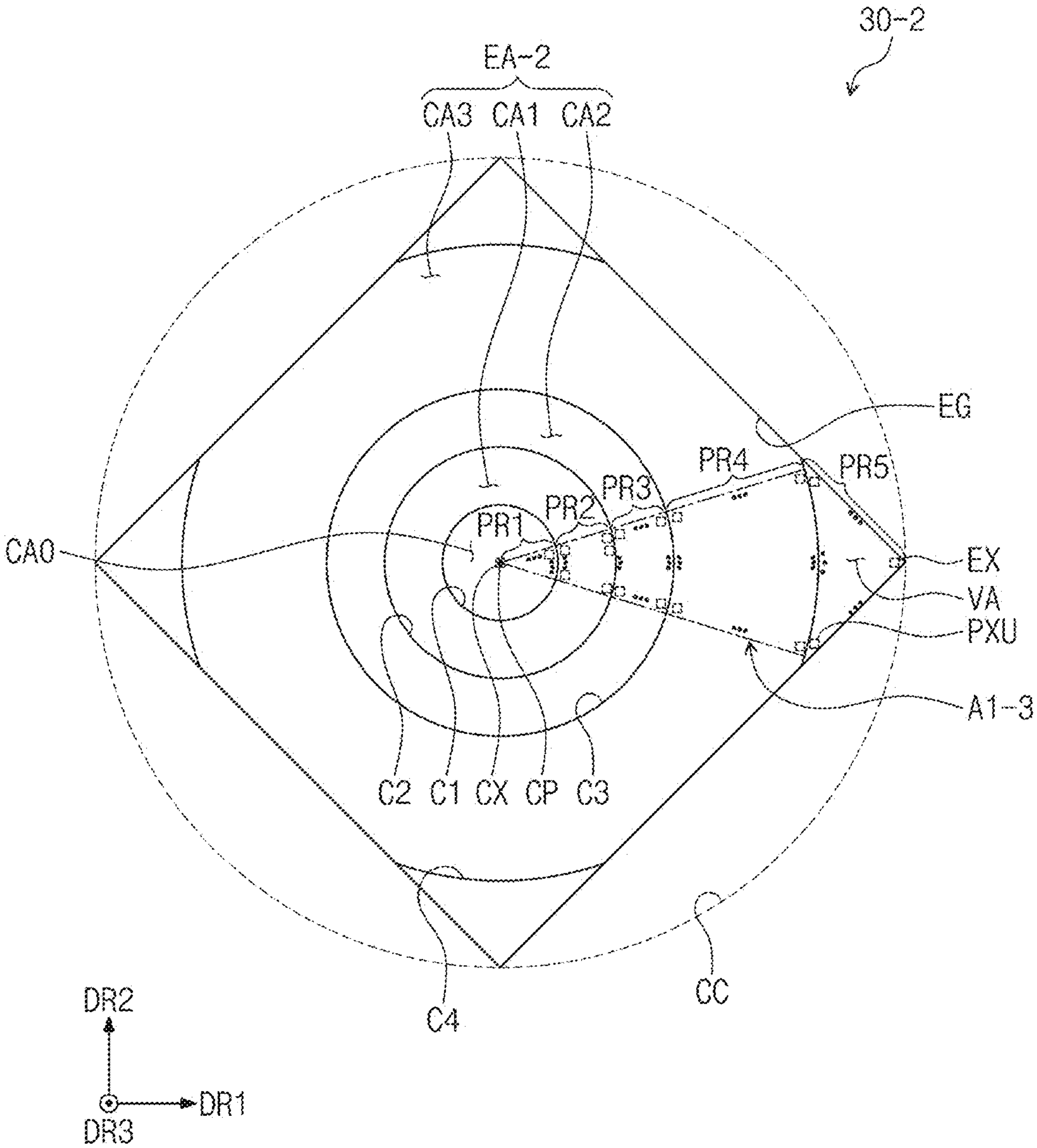
FIG. 8 is a plan view of a light modulation panel, according to an embodiment of the present disclosure.

FIG. 8 is a plan view of a light modulation panel, according to an embodiment of the present disclosure.

The configurations identical/similar to those described with reference to FIGS. 1 to 5 are given identical/similar reference symbols, and duplicate descriptions will be omitted.

A light modulation panel 30-2 according to the present embodiment may have a rectangular shape on a plane. The outline of the light modulation panel 30-2 according to the present embodiment may correspond to a biggest rhombus that can be inscribed in the circular light modulation panel 30-1 illustrated in FIG. 6.

A circumscribed circle CC that is in externally contact with the light modulation panel 30-2 may be defined on the outside of the light modulation panel 30-2. A center CP of the circumscribed circle CC may be defined on the light modulation panel 30-2. In this specification, the center CP of the circumscribed circle CC may also be the center of the light modulation panel 30-2.

The light modulation panel 30-2 may include the center area CA0, an outer area EA-2, and a corner area VA.

The center area CA0 may be a circular area centered around the center CP of the circumscribed circle and having a radius that is smaller than half of a length of a side of the light modulation panel 30-2.

The outer area EA-2 may be an area surrounding the center area CA0. The outer area EA-2 may include ring-shaped areas and an area of a partial-ring shaped areas from which arcs are removed. FIG. 8 illustrates as an example that the outer area EA-2 includes the first and second ring-shaped outer areas CA1 and CA2 and a third ring-shaped outer area CA3 from which four arcs are removed. However, the embodiment of the present disclosure is not limited thereto, and some embodiments of the light modulation panel 30-2 may include a higher number of ring-shaped outer area(s) or omit the ring-shaped area from which four arcs are removed.

The corner area VA may be an area adjacent to one corner of the rectangular shape of the light modulation panel 30-2 that is adjacent to the outer area EA-2. The single light modulation panel 30-2 may include four corner areas VA.

The light modulation panel 30-2 may include the unit pixels PXU. Each of the unit pixels PXU may include first to third sub-pixels SPX1, SPX2, and SPX3.

In FIG. 8, for convenience of description, only some of the unit pixels PXU arranged in the center area CA0 and an area A1-3, and only some of the unit pixels PXU arranged in the corner area VA are illustrated, and the remaining unit pixels PXU are omitted. Area A1-3 is a fan-shaped area included in the outer area EA-2 in the light modulation panel 30-2. The arrangement of the unit pixels PXU to be described with reference to FIG. 8 may be equally applied to the remaining areas on the light modulation panel 30-2.

The first pixel group PR1 may be arranged in the center area CA0, second, third, and fourth pixel groups PR2, PR3, and PR4 may be arranged in the first to third outer areas CA1, CA2, and CA3, and a fifth pixel group PR5 may be arranged in the corner area VA.

Each of the first to fifth pixel groups PR1 to PR5 may include the same unit pixels PXU. However, the embodiment of the present disclosure is not limited thereto, and one pixel group may include a combination of different unit pixels PXU.

The number of first sub-pixels SPX1 (refer to FIG. 4) included in each of the unit pixels PXU may decrease with distance from the center CP of the circumscribed circle moving toward the outer edge EG. The number of second sub-pixels SPX2 (refer to FIG. 4) included in each of the unit pixels PXU may increase with distance from the center CP of the circumscribed circle moving toward the outer edge EG.

Since the present embodiment has a rectangular shape, unlike the embodiment having a circular shape, the distance from the center CP of the light modulation panel to the outer edge EG may vary depending on the direction. For example, the distance from the center CP of the light modulation panel to a vertex may be longer than the length from the center CP of the light modulation panel to a corner.

Figure 9:
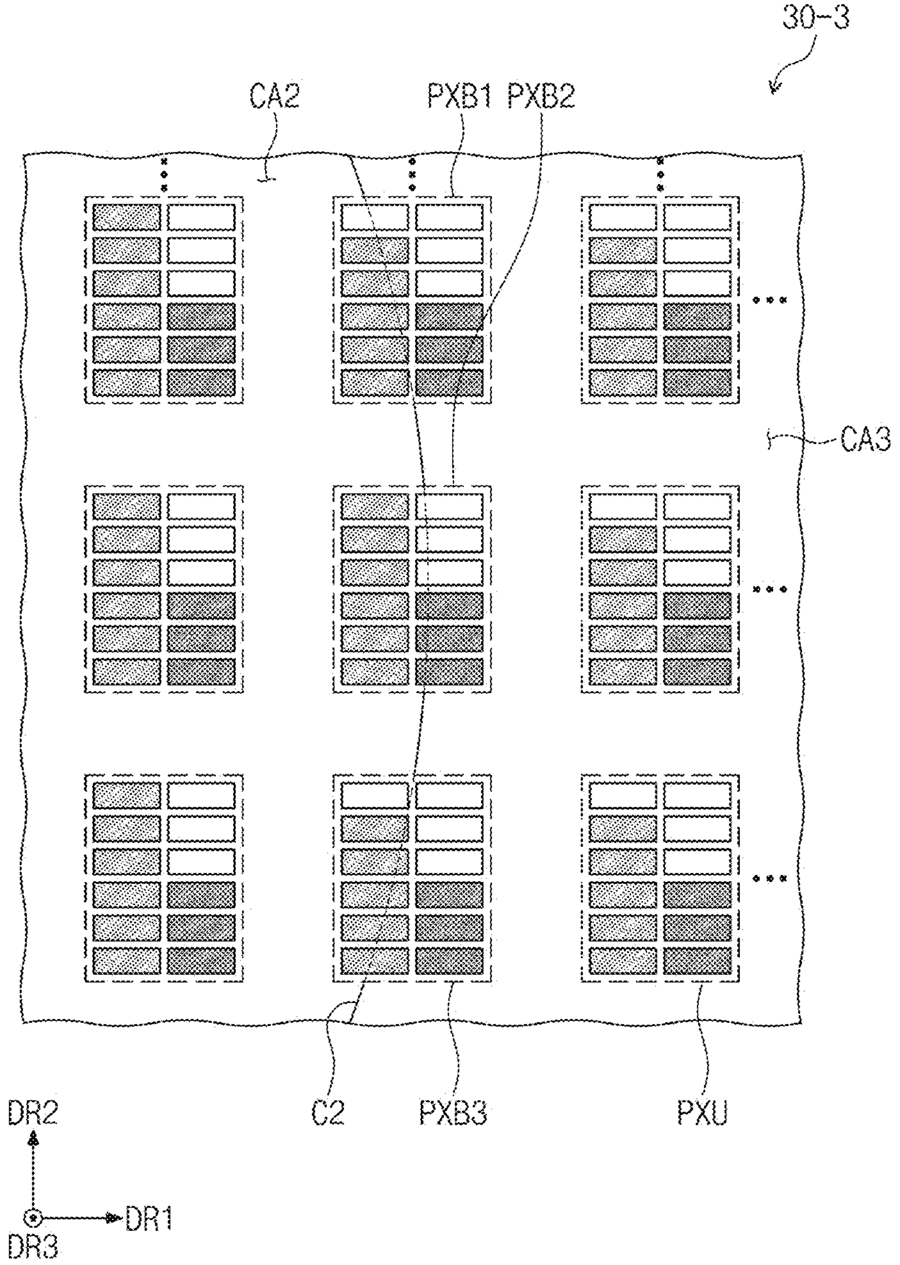
FIG. 9 is an enlarged plan view of a light modulation panel, according to an embodiment of the present disclosure.

FIG. 9 is an enlarged plan view of a light modulation panel, according to an embodiment of the present disclosure.

In this embodiment, the unit pixels PXU may be arranged in the first direction DR1 and the second direction DR2. In this case, some of the unit pixels PXU may overlap either the boundary between the center area CA0 (refer to FIG. 3) and the outer area EA (refer to FIG. 3) or the boundaries that separate the sections of the outer area EA (refer to FIG. 3). The unit pixels PXU that overlap such boundaries may be referred to as "boundary unit pixels".

FIG. 9 illustrates an example of three boundary unit pixels PXB1, PXB2, and PXB3 of the unit pixels PXU. The boundary unit pixels PXU are arranged along the boundary between two sections of the outer area. For example, FIG. 9 depicts boundary unit pixels PXB1, PXB2, and PXB3 that are partially in the second outer area CA2 and partially in the third outer area CA3. A unit pixel that occupies two sections may have the sub-pixel of the section occupied by the majority area of the unit pixel PXU.

For example, the first boundary unit pixel PXB1 and the third boundary unit pixel PXB3 are arranged such that more than half of the first boundary unit pixel PXB1 and more than half of the third boundary unit pixel PXB3 is in the third outer area CA3. Based on this, the first boundary unit pixel PXB1 and the third boundary unit pixel PXB3 may have the unit pixel PXU configuration of the third outer area CA3 (5-4-3 as depicted in FIG. 9). As for the second boundary unit pixel PXB2, more than half of the second boundary unit pixel PXB2 is in the second outer area CA2 and less than half is in the third outer area CA3. Based on this position, the second boundary unit pixel PXB2 may have the unit pixel PXU configuration of the second outer area CA2 (6-3-3 as depicted in FIG. 9).

According to the hologram display device of an embodiment of the present disclosure, chromatic aberration of the hologram image formed by the hologram display device may be reduced or prevented. Accordingly, the visibility of the hologram image formed by the hologram display device may be improved.

Although the present disclosure has been described above with reference to embodiments thereof, it will be understood by those skilled in the art or having ordinary knowledge in the art that various modifications, and substitutions are possible, without departing from the spirit and the technical scope of the present disclosure as set forth in the claims below. Accordingly, the technical scope of the present disclosure is not limited to the detailed description of this specification, but should be defined by the claims.

What is claimed is:

1. A hologram display device comprising:

a light source unit that provides source light; and a light modulation panel spaced apart from the light source unit, the light modulation panel including unit pixels and forming a circular shape on a plane, wherein each of the unit pixels includes first sub-pixels, second sub-pixels, and third sub-pixels, and wherein the number of first sub-pixels included in each of the unit pixels decreases with distance from a center of the light modulation panel moving toward an outer edge of the light modulation panel.

2. The hologram display device of claim 1, wherein the number of second sub-pixels included in each of the unit pixels increases with distance from the center of the light modulation panel moving toward the outer edge of the light modulation panel.

3. The hologram display device of claim 1, wherein the number of third sub-pixels included in each of the unit pixels is constant.

4. The hologram display device of claim 1, wherein each of the first sub-pixels, the second sub-pixels, and the third sub-pixels have the same area on the plane.

5. The hologram display device of claim 1, wherein among the unit pixels, the unit pixel closest to the center of the light modulation panel is a center-adjacent pixel, and the number of first sub-pixels included in the center-adjacent pixel is greater than the number of second sub-pixels included in the center-adjacent pixel.

6. The hologram display device of claim 5, wherein the number of first sub-pixels included in the center-adjacent pixel is between 1.2 times and 2.8 times the number of second sub-pixels included in the center-adjacent pixel.

7. The hologram display device of claim 1, wherein among the unit pixels, the unit pixel that is farthest from the center of the light modulation panel is an outer adjacent pixel, and the number of second sub-pixels included in the outer adjacent pixel is greater than the number of first sub-pixels included in the outer adjacent pixel.

8. The hologram display device of claim 7, wherein the number of second sub-pixels included in the outer adjacent pixel is between 1.05 times and 1.55 times the number of first sub-pixels included in the outer adjacent pixel.

9. The hologram display device of claim 1, wherein the first to third sub-pixels included in each of the unit pixels are arranged in n rows and m columns, wherein n is a natural number greater than or equal to 4 and less than or equal to 8, and wherein m is a natural number greater than or equal to 2 and less than or equal to 4.

10. The hologram display device of claim 1, wherein the first sub-pixel provides blue light, the second sub-pixel provides red light, and the third sub-pixel provides green light.

11. The hologram display device of claim 1, further comprising:

a first optical unit disposed between the light source unit and the light modulation panel and including a first lens, and a second optical unit across the light modulation panel from the light source unit, the second optical unit including a second lens.

12. The hologram display device of claim 1 further comprising an imaginary concentric circle centered around the center of the light modulation panel, wherein the unit pixels are arranged along a circumference of the concentric circle and overlap with the circumference of the concentric circle.

13. The hologram display device of claim 12, wherein a total area of the first sub-pixels included in each of the unit pixels decreases with distance from the center of the light modulation panel moving toward the outer edge of the light modulation panel, and wherein a total area of the second sub-pixels included in each of the unit pixels increases with distance from the center of the light modulation panel moving toward the outer edge of the light modulation panel.

14. The hologram display device of claim 1, wherein the light modulation panel includes a center area where a first subset of the unit pixels are disposed and overlaps the center; and an outer area surrounding the center area, in which a second subset of the unit pixels that is not included in the first subset of the unit pixels is disposed, and wherein the number of first sub-pixels included in the unit pixels in the first subset is greater than the number of second sub-pixels included in the unit pixels in the first subset, and wherein the outer area includes a first area where the number of first sub-pixels included in the unit pixels disposed is greater than the number of second sub-pixels, and a second area where the number of second sub-pixels included in the unit pixels disposed is greater than the number of first sub-pixels.

15. The hologram display device of claim 14, wherein the outer area further includes an intermediate area disposed between the first area and the second area, and wherein the number of first sub-pixels included in the unit pixels disposed in the intermediate area is the same as the number of third sub-pixels included in the unit pixels disposed in the intermediate area.

16. The hologram display device of claim 15, wherein the unit pixels are arranged in a first direction and a second direction intersecting the first direction, and wherein some of the unit pixels overlap with one of boundaries between the center area, the first area, the second area, and the intermediate area.

17. A hologram display device comprising:

a light source unit that provides source light; and a light modulation panel spaced apart from the light source unit, the light modulation panel including pixels and forming a rectangular shape on a plane, and wherein each of the pixels includes first sub-pixels, second sub-pixels, and third sub-pixels, and wherein the number of first sub-pixels included in each of the pixels decreases with distance from a center of the light modulation panel to an outer edge of the light modulation panel.

18. The hologram display device of claim 17, wherein the number of second sub-pixels included in each of the pixels increases with distance from the center of the light modulation panel moving toward the outer edge.

19. The hologram display device of claim 17, wherein each of the first sub-pixels, the second sub-pixels, and the third sub-pixels have a same shape and a same area on the plane, and wherein the light modulation panel further includes a center area centered around the center;

an outer area surrounding the center area; and corner areas adjacent to the outer area and extending to vertices of the rectangular shape.

20. An electronic device comprising:

a processor; and a hologram display device;

wherein the hologram device comprises:

a light source unit that provides source light; and a light modulation panel spaced apart from the light source unit, the light modulation panel including unit pixels and forming a circular shape on a plane, wherein each of the unit pixels includes first sub-pixels, second sub-pixels, and third sub-pixels, and wherein the number of first sub-pixels included in each of the unit pixels decreases with distance from a center of the light modulation panel moving toward an outer edge of the light modulation panel.

* * * * *